United States Patent
Morii et al.

(10) Patent No.: US 6,679,442 B2
(45) Date of Patent: Jan. 20, 2004

(54) METHOD OF RECYCLING

(75) Inventors: Yoshihiro Morii, Tokyo (JP); Satosu Souma, Tokyo (JP); Shunichi Ogawa, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 45 days.

(21) Appl. No.: 10/143,979

(22) Filed: May 14, 2002

(65) Prior Publication Data

US 2002/0185414 A1 Dec. 12, 2002

(30) Foreign Application Priority Data

May 14, 2001 (JP) ........................................ 2001-144009

(51) Int. Cl.$^7$ .............................................. B02C 17/02
(52) U.S. Cl. ....................................................... 241/24.1
(58) Field of Search ............................. 241/24.1, 24.12, 241/27, DIG. 38; 209/12.1; 29/403.3, 403.1

(56) References Cited

U.S. PATENT DOCUMENTS

| | | | |
|---|---|---|---|
| 4,493,573 A | 1/1985 | Hashimoto et al. | 400/647.1 |
| 4,795,284 A | 1/1989 | Yumoto et al. | 400/352 |
| 4,846,595 A | 7/1989 | Kato et al. | 400/320 |
| 6,000,784 A | 12/1999 | Takemoto et al. | 347/50 |
| 6,127,012 A | 10/2000 | Nagatsuna et al. | 428/40.1 |
| 6,217,684 B1 | 4/2001 | Morii et al. | 156/64 |
| 6,224,709 B1 | 5/2001 | Takemoto et al. | 156/275.5 |
| 6,258,150 B1 * | 7/2001 | MacKellar | 241/24.1 |

FOREIGN PATENT DOCUMENTS

| | | |
|---|---|---|
| JP | 7-334583 | 12/1995 |
| JP | 2000-84532 | 3/2000 |
| JP | 2000-126749 | 5/2000 |

* cited by examiner

*Primary Examiner*—Allen Ostrager
*Assistant Examiner*—Jimmy T Nguyen
(74) *Attorney, Agent, or Firm*—Oblon, Spivak, McClelland, Maier & Neustadt, P.C.

(57) ABSTRACT

A recycling method comprises classifying products to be recycled on the basis of classifier unit information, decomposing and fractionating some of the products on the basis of fractionator unit information. Applying a physical action to the fractionated products on the basis of physical action information. Producing a recycled material on the basis of recycled material producer unit information. Producing a recycled component from the recycled materials on the basis of recycled component producer unit information. The information required at each step is appropriately supplied.

22 Claims, 8 Drawing Sheets

| COLLECTED MACHINE NAME | PROCESSING TYPE |
|---|---|
| A | MATERIAL RECYCLE |
| B | COMPONENT REUSE |
| C | MATERIAL RECYCLE |
| D | PRODUCT REUSE |
| ⋮ | ⋮ |

METHOD OF RECYCLING

FIELD OF THE INVENTION

The present invention relates to a method of recycling office automation (OA) machines, such as copiers, printers and facsimiles, and household electrical products. More particularly, this invention relates to a recycling method capable of constructing the plastic closed-loop material recycle (PCMR).

BACKGROUND OF THE INVENTION

In the current society, importance on environmental issues has been recognized increasingly more than before. In addition, consumers and investors have become strict to choose enterprises on the basis of their consideration on environment. The enterprises are therefore required to have future subjects for environmental protective activities as well as previously performed benefit creative activities.

In terms of effective use of resources and reduction of wastes, the enterprises are urgently required to establish a system for recycling and using reusable products, components and materials. With respect to such the recycling, processing manners (process levels) can be roughly classified into the following classification.

1. Home reuse,

Home reuse is defined as a process of recycle performed by the user of a product to reuse a part of the product (such as a component). For example, in a copier, it corresponds to a process of refilling toner in a toner container for reuse by the user itself. In this case, a recycling object (the toner container in the above example) will not lower its value. Accordingly, the home reuse can be considered as a processing manner (process level) that has the largest effect and the least cost on environmental load reduction.

2. Product reuse,

Reuse of products is defined as a process of recycle for performing a certain recycling process to used products themselves collected from the market, which are so-called collected machines, to reuse them as recycled machines. In this processing, the major part of the product can be employed as such, exhibiting an extremely large effect on environmental load reduction.

3. Component reuse,

Reuse of components is defined as a process of recycle for removing components or units from the collected machines to reuse them as units or components for new products. In this processing, the components or units, which are otherwise produced with a considerable amount of energy consumed on processing and the like, can be employed in recycled machines, exhibiting a large effect on environmental load reduction.

4. Material recycle,

Recycle of materials is defined as a process of recycle for decomposing and fractionating the collected machines into basic materials, thereafter performing a certain processing to them for reuse as recycled materials. This processing includes the closed-loop material recycle for reusing them as materials of products in the same field and the open-loop material recycle for reusing them as materials of products in different fields.

5. Recycle to raw materials,

Recycle to raw materials is defined as a process of recycle for decomposing and fractionating the collected machines and finally returning them to a raw material level for reuse. This processing is effective to achieve zero-waste.

6. Energy recovery,

Energy recovery is defined as a process of burning plastics, for example, to effectively utilize their thermal energy.

The above processing manners (process levels) 1 to 6 have effects on the environmental load reduction in an order of 1, the most desirable, then 2, 3, . . . Therefore, it is important for specific recycle promotion to continuously recycle in the upper process as long as possible.

In practice, however, a process can not be continued on a semi-permanent basis only at the upper level of the above process levels, for example, the "Home reuse". It is therefore required to abandon the process after a certain time period. Because the function of the product is degraded after a certain time period and the function itself becomes useless already in the market (or to the user).

In that case, the recycle performed at the upper process is forced to transfer to the lower process (for example, the matter recycled at the "Home reuse" transfers to the process 2 or below). Thus, the process transferred lower is employed to recycle again for a certain time period. If it is degraded, then sequentially transferred to a further lower process.

In the recycle, therefore, it is not sufficient to perform either one of the above processes 1 to 6. Rather, it is important to perform all the processes to stand the environmental protective activities together with the benefit creative activities.

In such the situation, importance on the "Material recycle", in particular on the closed-loop material recycle has been remarked recently. The material recycle described above is considered as an important processing. Because it is possible "to more easily create anew function (value)" compared to the three upper processes described above. In a word, it has an advantage on profit creation.

In the recycles performed in the "Home reuse", "Product reuse" and "Component reuse", functions of objects to be reused are directly developed in the next recycled machines (the products in the case of the home reuse) and accordingly hardly improved. In new products having renewed functions compared to the conventional products, the higher the function renewal level, the harder the above three recycle processes respond.

On the other hand, through the use of objective materials to produce entirely new components, the material recycle can be applied to new products with improved or renewed functions. Because the material recycle in the first place means a cycle to "reuse a property of material" to "newly create a matter provided with new functions".

The material recycle has a characteristic that is also in common with the process of the "Recycle to raw materials". The process of recycle to raw materials is a process of returning the material to its original state of raw material and accordingly has a disadvantage because it requires an increased number of process steps compared to the material recycle. In general, the "Recycle to raw materials" is disadvantageous in cost compared to the material recycle.

Of the material recycles, when the closed-loop material recycle is compared with the open-loop material recycle, the closed-loop material recycle is more excellent in multi-time circulation of resources, in other words, in possibility of many-time usability.

The Inventors et al. report effects on the environmental protection in the publication, "OA MACHINES" ("PLASTICS AGE ENCYCLOPEDIA<Progressed version>2000", October 1991). In this report, LCA (Life Cycle Assessment) technology is utilized to compare loads on the environment. One load is imparted from an entirely new production and another from a production by the closed-loop material recycle. The result demonstrates that the closed-loop material recycle is more effective on the environmental protection.

The success or failure of the closed-loop material recycle therefore determines the success or failure of the environmental protection challenged by an enterprise while maintaining the profit creation.

In the objective materials of the material recycle, the plastic closed-loop material recycle (hereinafter referred to as PCMR, if required) has further increased importance on recycling OA machines such as copiers from the following ground.

A copier is often employed in an office due to its characteristic of product. Therefore, from the viewpoint of the office security, the copier is required to have extremely high-level fire prevention or flame redundancy. This need is fundamentally an issue necessarily kept based on the fire-related law.

A component of plastic material in the copier, for example, an exterior cover employs a plastic that contains a flame-redundant agent. The flame-redundant agent for use in the plastic is roughly classified into halogen series mainly containing bromine and non-halogen series, both of which influence greatly on the environment.

In consideration of future risks on environmental loads, desirably, OA machine makers themselves can control the flame-redundant agent through recycling. In comparison with the plastic open-loop material recycle that reuses plastics for products in other fields, PCMR can ensure the control more reliably because it reuses them in the same field (its own products).

Thus, the success or failure of PCMR can be considered important particularly for OA machine makers to achieve successful recycles.

Various technologies are disclosed in the art with the aim of efficient recycling. A first prior art is found in Japanese Patent Application Laid-open No. H7-334583A, entitled "System for recycling products". This system comprises an "input unit" for use in entering product-related information, a "storage unit" for storing a database of information on reuse of products. It also comprises a "recycling method determination unit", which refers to the database information stored in the "storage unit", based on the product-related information entered from the "input unit", for determining a recycling method that relates to the product based on predetermined recycle rules. It further comprises a "recycling plant facility controller unit", which serves as an output unit that supplies the determined result to the next step.

The above prior art may be applied to the closed-loop material recycle such as PCMR. The technology in the publication, however, is designed to determine a recycling method based on "information added to a product", Therefore, it causes a problem because of difficulty to determine appropriate closed-loop material recycling in a system that includes a "unit for reading information added to a collected machine".

An information system like the above prior art manages recycling units in a hierarchical structure that defines an order of product→component→material from the upper. In this structure, a basic matter is a machine (product) collected, a smaller matter is a component mounted on it, and a much smaller matter is a material contained in the component. Such the information system may cause a step in steps for recycling, which is difficult to read information (in turn determine a recycling unit).

When the collected machine passes through PCMR and reaches to a stage for producing recycled components (molding recycled plastic components in this case) or a stage for finally assembling a recycled machine, original traces of the collected machine (product) are hardly remained. Therefore, it may be often impossible to read out information.

In practice, there are various types of original collected machines (products), which are mixed (the same materials are extracted from various products and mixed) followed by recycling. In this case, the recycled plastic components can not correspond to the original collected machines one by one, resulting in a problem because of complicated matching with the "processing manners".

The above problem is derived from the following ground. There is a trend to divide a recycle into plural steps. In addition, it is difficult to complete a recycle in a single enterprise so as to achieve the profit creation and environmental protection simultaneously. Therefore, plural enterprises may often share and perform the role cooperatively while dividing steps. The above problem is also derived from the next point. The "product" is a complete article created in a single enterprise. Therefore, the cooperatively recycling enterprises can not always share the concept of the "product" as a basic matter.

The above problem can be avoided in a system for constructing a product making process, commonly called an "artery". A material maker creates materials, from which a component maker creates components, from which a product maker creates final products. In this case, what each maker considers as its own "products" (that is, materials, components and final products) may be different from one another. Even though, they can be grasped hierarchically as the final product and its constituent elements, which are uniquely associated with each other. The prior art applies this concept in a "vein" that begins from collection of products.

The following problem is present in the closed-loop material recycle that "creates products" using circulation through the "artery" and "vein". The closed-loop material recycle employs a work for fractionating a large element into smaller elements (for example, fractionation of a product into basic materials) to a certain stage in specific works. In contrast, from the middle in the specific works, it employs a work for bonding small elements to form a larger element (from recycled materials to a recycled machine). At this stage, a problem is caused because a hierarchical relation among "products→components→materials" is corrupted and the unique association can not be kept.

The above described "System for recycling products" in Japanese Patent Application Laid-open No. H7-334583A is effective only when it is limited in the "artery" or "vein". To the contrary, there is a problem because a total form like PCMR that has the continuously ringed "artery" and "vein" can not stand in the recycle system.

The above prior art has another problem because the system is not suitable for collecting machines. In other words, when the prior art system is operated practically, work items may be different in accordance with types of collected machines, for example. This causes a problem because the works can not be performed smoothly and a work plan on daily recycle is interfered.

The above prior art has a further problem because the system is not suitable for performing "recycle" that is an essential step in PCMR, for example. In this first prior art, only the same contents as those in the above mentioned recycle processes (6 types) are described and there is no specific content to stabilize the quality of recycled materials. Therefore, recycling operations can not be performed smoothly.

Other prior arts than the above example include a technology disclosed in Japanese Patent Application Laid-open No. 2000-84532, entitled "System for recycling waste industrial products". This system first attaches an electronic tag on a waste product to allow a reader/writer to read and write data necessary for processing. It writes basic data, necessary for processing, into the electronic tag at the time and place for receiving the waste product from the client. Thereafter, it reads, writes and overwrites data to determine a suitable processing route per product. In addition, it measures characteristics of plastic materials and writes the result in the electronic tag. Assortment of decomposed components is performed by attaching an electronic tag on a palette, reading data from the electronic tag attached to the waste product and, based on this data, writing an assorted destination code in the electronic tag on the palette.

The second prior art has the same problem as that in the first prior art because basic matters of objects managed by the electronic tags are "waste industrial products" that are collected machines.

Japanese Patent Application Laid-open No. 2000-126749, entitled "Recycle management system", also discloses a conventional technology. This recycle management system is applied to a recycling plant that runs a series of plural processes beginning from receipt of process objects and reaching to shipment of them. After the plural processes are applied sequentially to the process objects, process data on the process objects is acquired and sent to the database every time each of the plural processes is performed.

This third prior art has the same problem as those in the first and second prior arts.

SUMMARY OF THE INVENTION

It is an object of the present invention to smoothly construct the closed-loop material recycle.

The present invention provides a recycling method for collecting used products or machines from the market, processing the collected machines to produce recycled machines as new products, and providing the recycled machines to the market. In the classification step, the collected machines are classified on the basis of classifier unit information including definitions on classifications and specific classifier units for classifying the collected machines in accordance with recycling process levels. In the fractionation step, the classified machines are decomposed and fractionated on the basis of fractionator unit information including definitions on decomposer/fractionator units for further decomposing and fractionating specific machines of the collected machines classified in the classification step and on fractionated basic matters including decomposed and fractionated basic units, components and materials. In the physical action step, a physical action is applied to the fractionated basic matters on the basis of physical action information including definitions on a physical actor unit for applying a physical action to a specific basic matter selected from the fractionated basic matters and on a physically acted basic matter after application of the physical action. In the recycled material production step, a recycled material is produced on the basis of recycled material producer unit information including definitions on recycled material producer units for producing recycled materials from the physically acted basic matter and on standard values of recycled materials. In the recycled component production step, a recycled component is produced from the recycled materials on the basis of recycled component producer unit information including definitions on recycled component producer units for producing recycled components from the recycled materials and on standard values of recycled components. In the recycle unit definition step, the classifier unit information, the fractionator unit information, the physical action information, the recycled material producer unit information and the recycled component producer unit information are created. And each of the information is transferred to the classification step, the fractionation step, the physical action step, the recycled material production step and the recycled component production step, respectively.

According to the present invention, quality insurance is executed unitarily in the recycle unit definition step while including indispensable steps for the closed-loop material recycle. Therefore, work contents can be optimized in consideration of the whole balance. In addition, the process content can be determined directly on the basis of the information from the recycle unit definition step and the matter carried into each step. Thus, the closed-loop material recycle can be smoothly constructed.

Other objects and features of this invention will become apparent from the following description with reference to the accompanying drawings.

DETAILED DESCRIPTIONS

Embodiments of the present invention will be described in detail with reference to the accompanying drawings.

Figure 1:
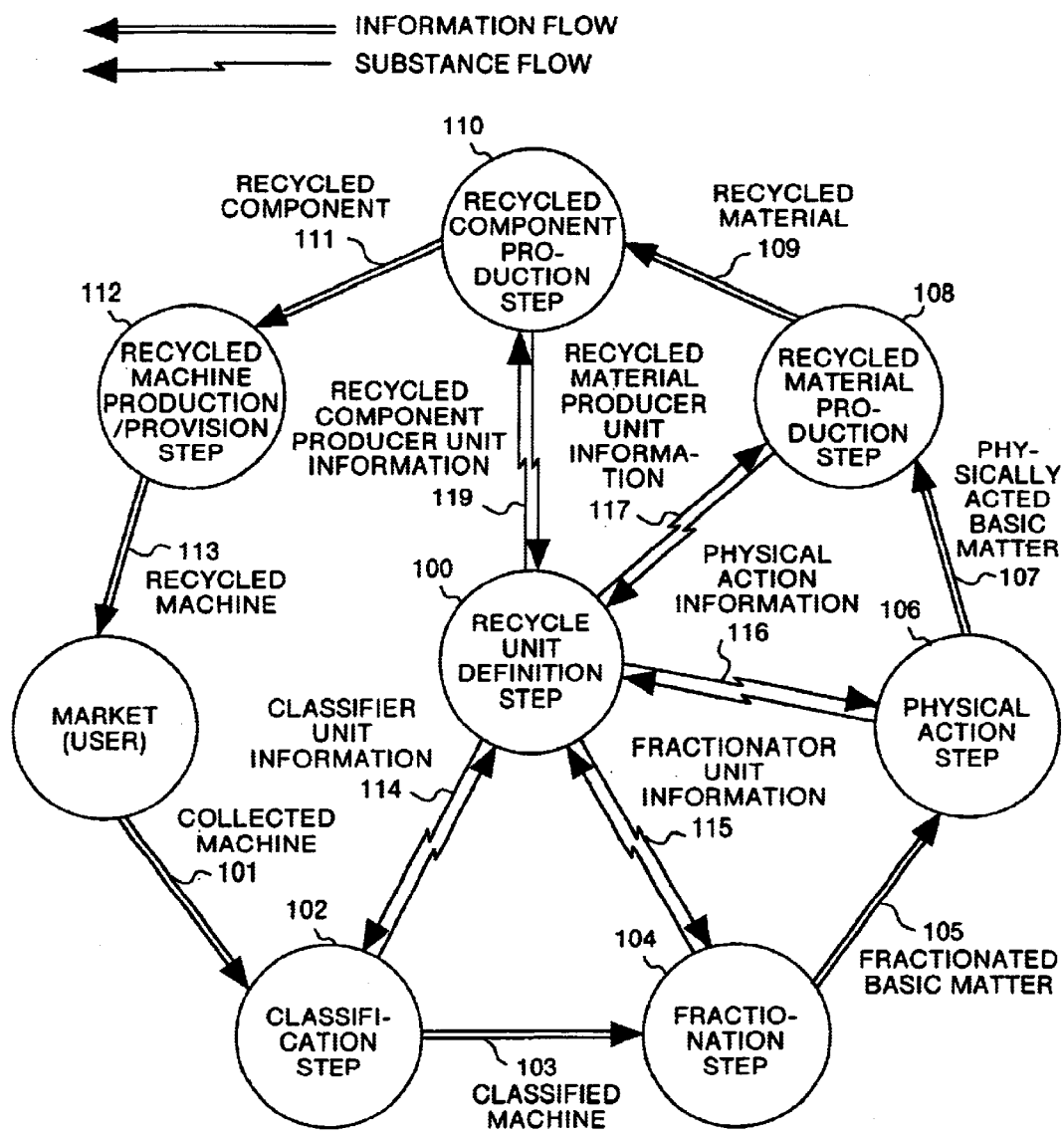
FIG. 1 is a schematic diagram which shows a process flow to form the closed-loop material recycle according to an embodiment.

FIG. 1 is a schematic diagram which shows a process flow to form the closed-loop material recycle according to an embodiment. When a used product or machine 101 is collected from the market (the user), the collected machine 101 is first transferred to the classification step 102 for processing.

In the classification step 102, the collected machine 101 is classified in accordance with a recycle processing manner or recycle process level corresponding to the collected machine 101. The recycle process level is one of the above mentioned product reuse, component reuse, material reuse, recycle to raw materials and energy recovery. The home reuse contained in the recycle process levels is not considered herein because it is a recycle performed by the user itself without any collection.

Figures 2, 3:
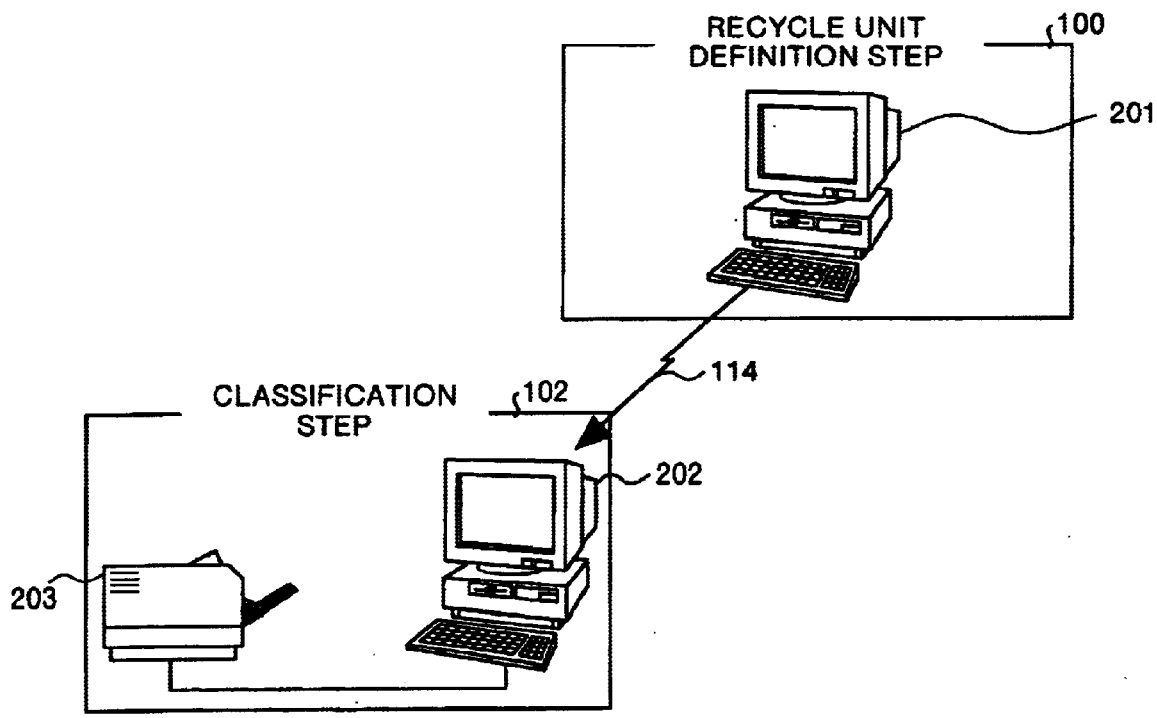
FIG. 2 is a schematic diagram which shows an example of transmission of the classifier unit information from the recycle unit definition step to the classification step.
FIG. 3 is a schematic diagram which shows an example of the classifier unit information transmitted from the recycle unit definition step to the classification step.

The information on which of collected machines 101 belongs to either of the process levels is previously transmitted from the recycle unit definition step 100 as the classifier unit information 114 before the collected machine 101 is subjected to the classification step 102. FIG. 2 is a schematic diagram which shows an example of transmission of the classifier unit information 114 from the recycle unit definition step 100 to the classification step 102. As shown, personal computers 201 and 202 are located at necessary places or steps to transmit the classifier unit information 114 via the Internet or LAN.

FIG. 3 is a schematic diagram which shows an example of the classifier unit information 114 transmitted from the recycle unit definition step 100 to the classification step 102. As shown, the classifier unit information 114 transmitted is configured in a format that includes comparable collected machine names and processing types. The personal computer 201 is employed in the recycle unit definition step 100 to create the classifier unit information 114 while the personal computer 202 is employed in the classification step 102 to display on its screen the classifier unit information 114 transmitted from the personal computer 201. In the classification step 102, the collected machine 101 is compared with the classifier unit information 114 to classify the collected machine 101 specifically.

In the classification step 102, the classifier unit information 114 may be output from a printer 203 connected to the personal computer 202. This allows an operator to confirm the work contents. In the classification step 102, the personal computer 202 may send the classifier unit information 114 to a decomposer/classifier (not depicted) to perform the work efficiently.

Figure 4:
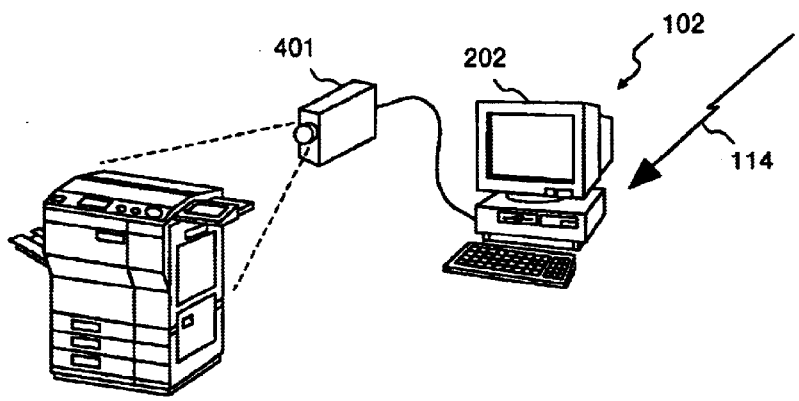
FIG. 4 is a schematic diagram which shows a personal computer that reads a collected machine for determining classification.

When the operator sees the collected machine but hardly determines its name, a publicly known image identification unit may be employed to allow the personal computer 202 to identify the collected machine type and determine the processing classification. FIG. 4 is a schematic diagram which shows a personal computer that reads a collected machine 101 for determining classification. In the figure, the reference numeral 401 denotes a video camera. The personal computer 202 classifies the collected machine 101 in accordance with the classifier unit information 114.

As described above, through the classification step 102, the collected machines 101 turn into classified machines 103 that are classified collected machines. Among those, such collected machines that belong to the "Product reuse" are carried to a different step for recycling products, not depicted. Other collected machines that belong to the "Component reuse", "Material recycle", "Recycle to raw material" and "Energy recovery" are carried to the fractionation step 104 for processing.

In the fractionation step 104, decomposition and fractionation corresponding to the classified machine 103 are performed. Resultant matters decomposed and fractionated are hereinafter referred to as fractionated basic matters 105, if required. The fractionated basic matters 105 specifically include three types, units, components and materials. In the fractionation step 104, how to decompose and fractionate which of the classified machines 103 can be determined using the fractionator unit information 115 previously transferred from the recycle unit definition step 100. As a transfer unit, the same unit as that described in FIG. 2 or 4 may be employed.

Figure 5:
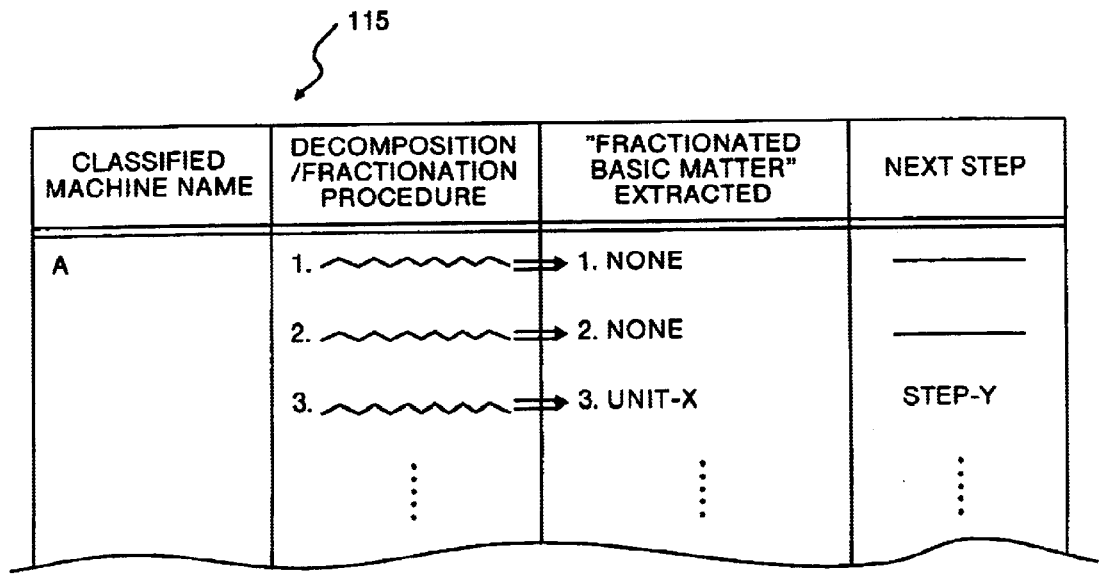
FIG. 5 is a schematic diagram which shows an example of the fractionator unit information transmitted from the recycle unit definition step to the fractionation step.

FIG. 5 is a schematic diagram which shows an example of the fractionator unit information 115 transmitted from the recycle unit definition step 100 to the fractionation step 104. As shown, the fractionator unit information 115 transmitted allows the names of the classified machines 103 to be compared with the manners of decomposition and fractionation. Specifically, it includes the decomposition and fractionation procedure, the fractionated basic matter 105 extracted from each work and the next destination after decomposition and fractionation.

The personal computer 201 for use in the recycle unit definition step 100 transmits the fractionator unit information 115 to a personal computer (not depicted) for use in the fractionation step 104 via the Internet or LAN. The personal computer for use in the fractionation step 104 displays the transmitted fractionator unit information 115 on a screen. Thus, an operator (not shown) is operative to decompose and fractionate in accordance with the fractionator unit information 115 displayed.

Thus decomposed and fractionated basic matters 105, each belonging to either of "Component reuse", "Material recycle", "Recycle to raw material" and "Energy recovery", can be recycled. Among those basic matters 105, such basic matters that belong to the "Component reuse" are carried to a different step for recycling components, not depicted. Other basic matters that belong to the "Material recycle", "Recycle to raw material" and "Energy recovery" are carried to the physical action step 106 shown in FIG. 1 for processing.

Figure 6:
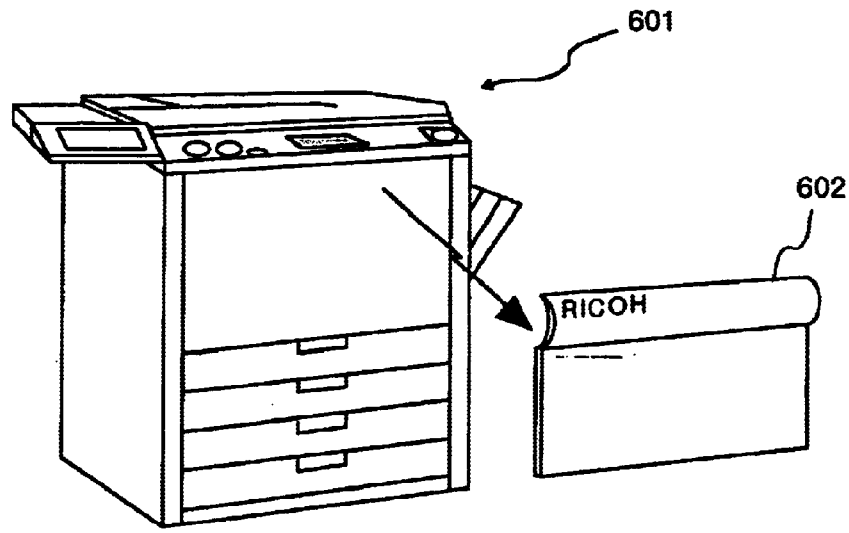
FIG. 6 is a schematic diagram which shows an example of the classified machine, which is further fractionated into fractionated basic matters through the fractionation step.

The fractionation step 104 is described with reference to an example of PCMR for copiers. The basic matters in PCMR are plastic materials. FIG. 6 is a schematic diagram which shows an example of the classified machine 103, which is further fractionated into fractionated basic matters 105 through the fractionation step 104. In the figure, a copier 601 is decomposed and an exterior cover 602 is removed therefrom.

Figure 7:
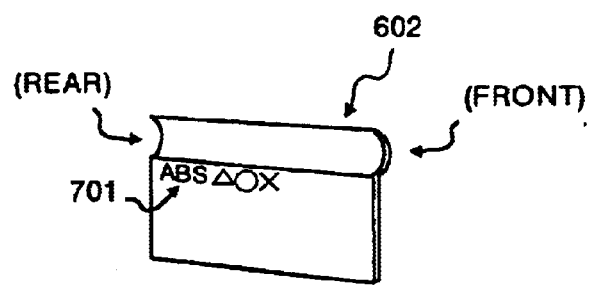
FIG. 7 shows the rear of the exterior cover shown in FIG. 6.

The fractionated basic matter 105 (the exterior cover 602 in FIG. 6) has a material name, which can be determined. FIG. 7 shows the rear of the exterior cover 602 shown in FIG. 6. As shown, a mark 701 is attached to the exterior cover 602 to indicate names of material and grade. The mark 701 may be attached on either of the front/rear surface of the product. Preferably, it may be attached on the rear from the viewpoint of appearance. The mark 701 may be provided with raised letters (not depicted) for blind operators in addition to textual indications.

Figure 8:
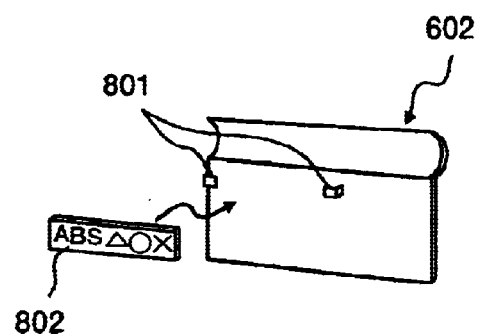
FIG. 8 shows an example of a structure with snap-fits for attaching a nameplate composed of the same material as that of the exterior cover.

In the example shown in FIG. 7, the mark 701 is formed integrally with a molding as a partly recessed or protruded shape but is not always required to be integrated. For example, as shown in FIG. 8, a structure with snap-fits 801 may be applied to attach a mark plate 802 composed of the same material as that of the exterior cover 602. In this case, a structure of two integrated components composed of the same material is considered as one basic matter 105.

Preferably, from the basic matters 105 of the plastic components (the exterior cover 602 in FIG. 6), other materials than plastics (for example, metallic materials) are removed. For that purpose, an additional work may be employed in the fractionation step 104 to remove foreign matters from plastic components. The fractionator unit information 115 is previously transmitted from the recycle unit definition step 100 to clearly determine the difference between the same type and the foreign matter with respect to the types of the basic matters 105.

Figure 9:
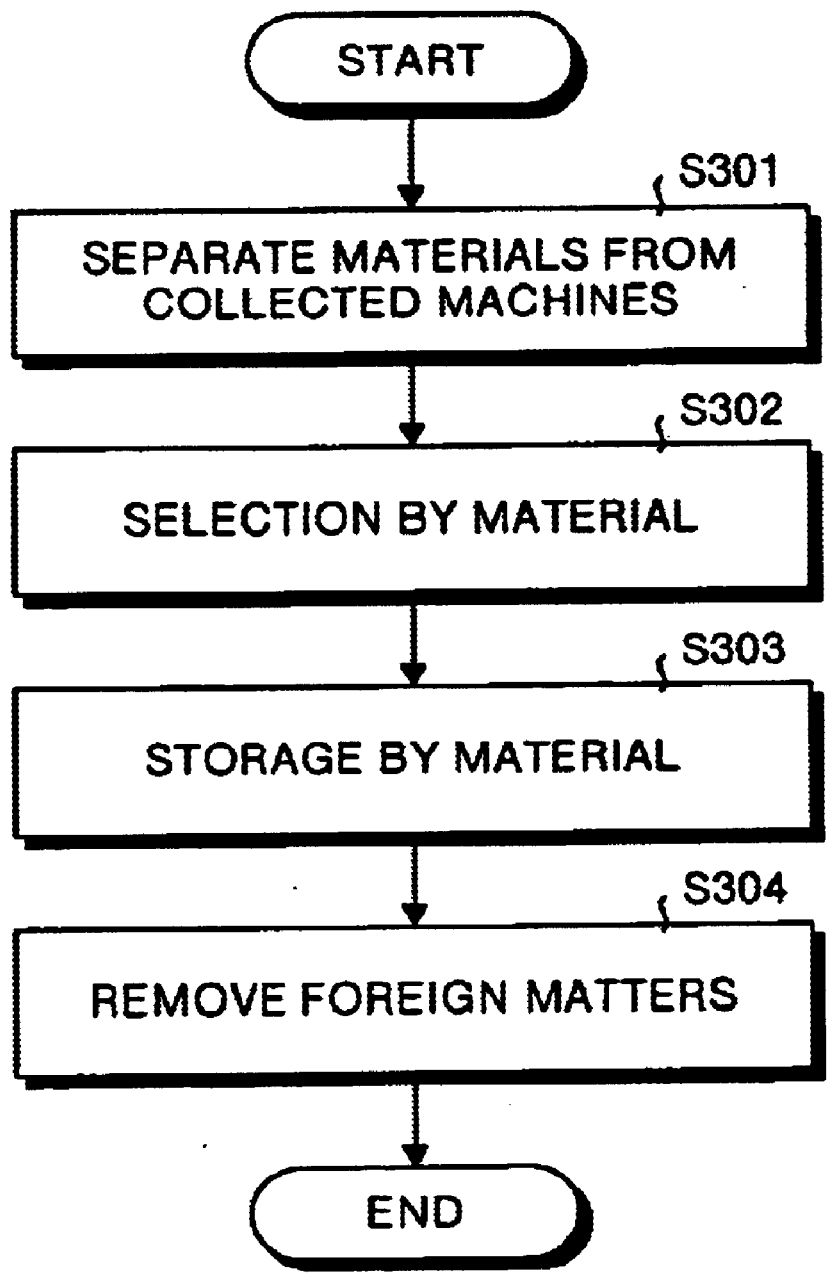
FIG. 9 shows an example of a workflow in the fractionation step in PCMR.

The above works in the fractionation step 104 in PCMR are sequentially described below. FIG. 9 shows an example of a workflow in the fractionation step in PCMR. First, at the fractionation step 104 in PCMR, materials are separated from the fractionated collected machine 103 (Step S301). Specifically, the operator or operational machine removes components of plastic materials (the exterior cover 602 in FIG. 6) from the fractionated machine 103.

Next, selection by material is performed (Step S302). Specifically, the operator or operational machine selects components by material and by grade with reference to the mark 701. Then, storage by material is performed (Step S303) Specifically, the components selected by material and by grade at the step S302 are temporarily stored each in a group. The selected components are grouped and contained in a storage container such as a Paretena. Preferably, the names of material and grade are indicated also on the storage container.

Finally, foreign matters are removed (Step S304). More specifically, foreign matters attached on the materials are removed. In the example of the exterior cover 602 of the copier, they correspond to a transparent plate (for accommodating a name card of a service man), brass (insert) seal and sponge. The work at the step S304 may be performed after the step S301 or S302.

Subsequently, the physical action step 106 is described. Detailed works executed in this step vary in accordance with the recycle process levels as well as types of the basic matters 105. Then, the example of PCMR is still employed for description hereinafter, if required.

In the physical action step 106, fragmentation of plastic materials (the exterior cover 602 in FIG. 6) or the basic matters 105 together with detection and removal of metals from fragmented pieces are mainly performed. How to perform the "fragmentation" and "detection and removal of metals" is defined in the physical action information 116 previously transmitted from the recycle unit definition step 100.

The "fragmentation" and "detection and removal of metals" can be executed using a certain facilities in general. Therefore, the physical action information 116 specifically transmitted has the contents that include condition settings such as facility drive parameters, maintenance conditions such as facility maintenance, and routine management conditions for facilities. A specific example of the physical action step 106 is described next.

Figure 10:
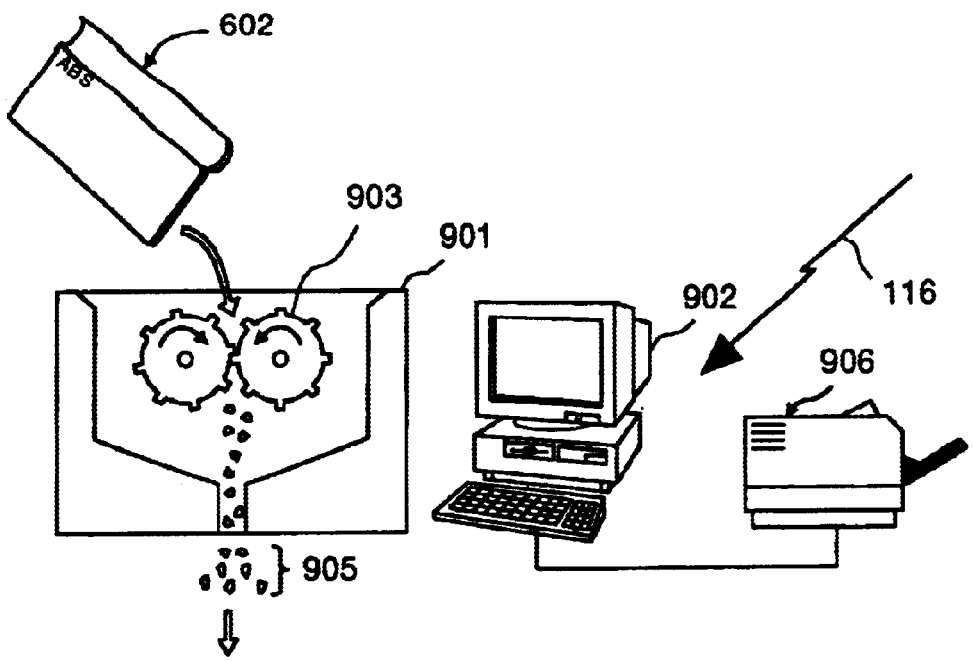
FIG. 10 is a schematic diagram which shows a fractionation system as an example of the physical processing in the physical action step.

FIG. 10 is a schematic diagram which shows a fractionation system as an example of the physical processing in the physical action step 106. First, the physical action information 116 or information required for fractionation is displayed on a personal computer 902 for use in the physical action step 106. The physical action information 116 has different contents basically in accordance with types of plastics. Next, a facility operator (not depicted) sets a condition on a fractionator 901 based on the physical action information 116. For example, the number of revolutions of a fractionator blade is included in the condition. The facility operator may watch the screen on the personal computer 902 to set the condition. Alternatively, a printer 906 may be employed to print the displayed contents on a recording sheet prior to the condition setting.

Figure 11:
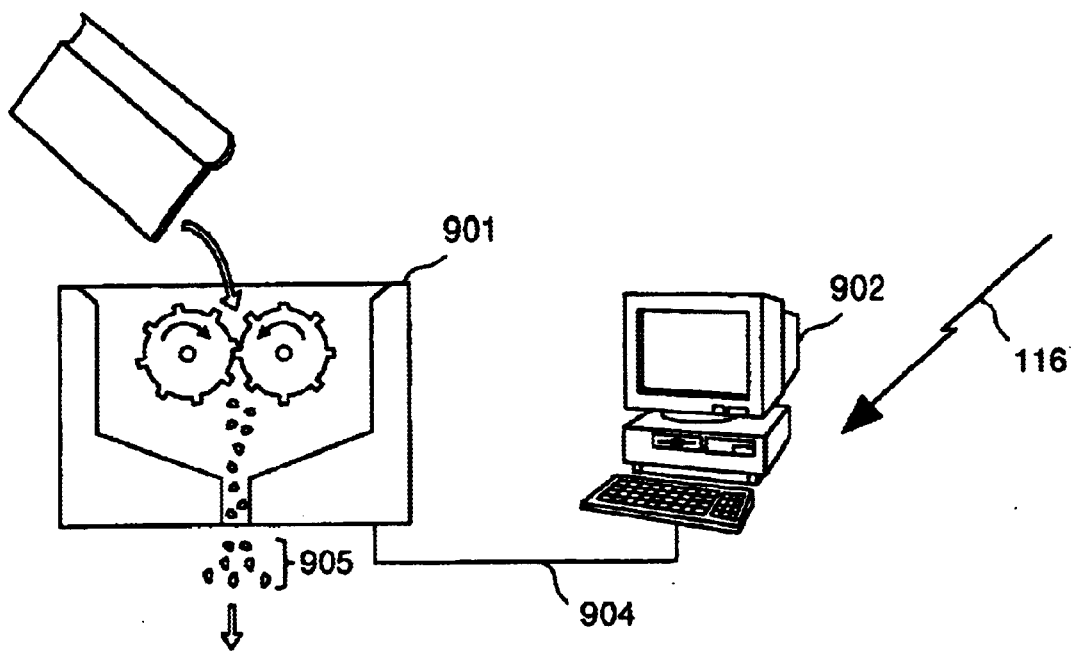
FIG. 11 is a schematic diagram which shows an example of the fractionation system including a personal computer for directly controlling the fractionator.

The personal computer 902 itself may directly control the fractionator 901. FIG. 11 is a schematic diagram which shows an example of the fractionation system including the personal computer 902 for directly controlling the fractionator 901. In this case, the personal computer 902 automatically sets drive conditions for the fractionator 901 based on the physical action information 116.

The "detection and removal of metals" can be executed in the same manner as the example of fragmentation. It is generally required, however, to divide the "detection and removal of metals" into two stages, detection and removal of irons, and detection and removal of nonferrous metals (such as aluminum). The detection and removal of irons basically adopts a magnetic selection system while the detection and removal of nonferrous metals basically adopts an eddy current system. Similar to the control shown in FIG. 11, the personal computer 902 is employed to control the system for detecting and removing irons or the system for detecting and removing nonferrous metals.

Other than the "fragmentation" and "detection and removal of metals", the physical action information 116 may contain a test standard for a physically acted basic matter 107 or the basic matter 105 passed through the physical action step 106. In the examples shown in FIGS. 10 and 11, a physical action may be applied with reference to a standard in accordance with information including sizes, shapes and tones of fractionated pieces or collected materials 905, and occasionally a state of residual metal mixed after the "detection and removal of metals". A tester (not depicted) may be employed to execute a test.

Figure 12:
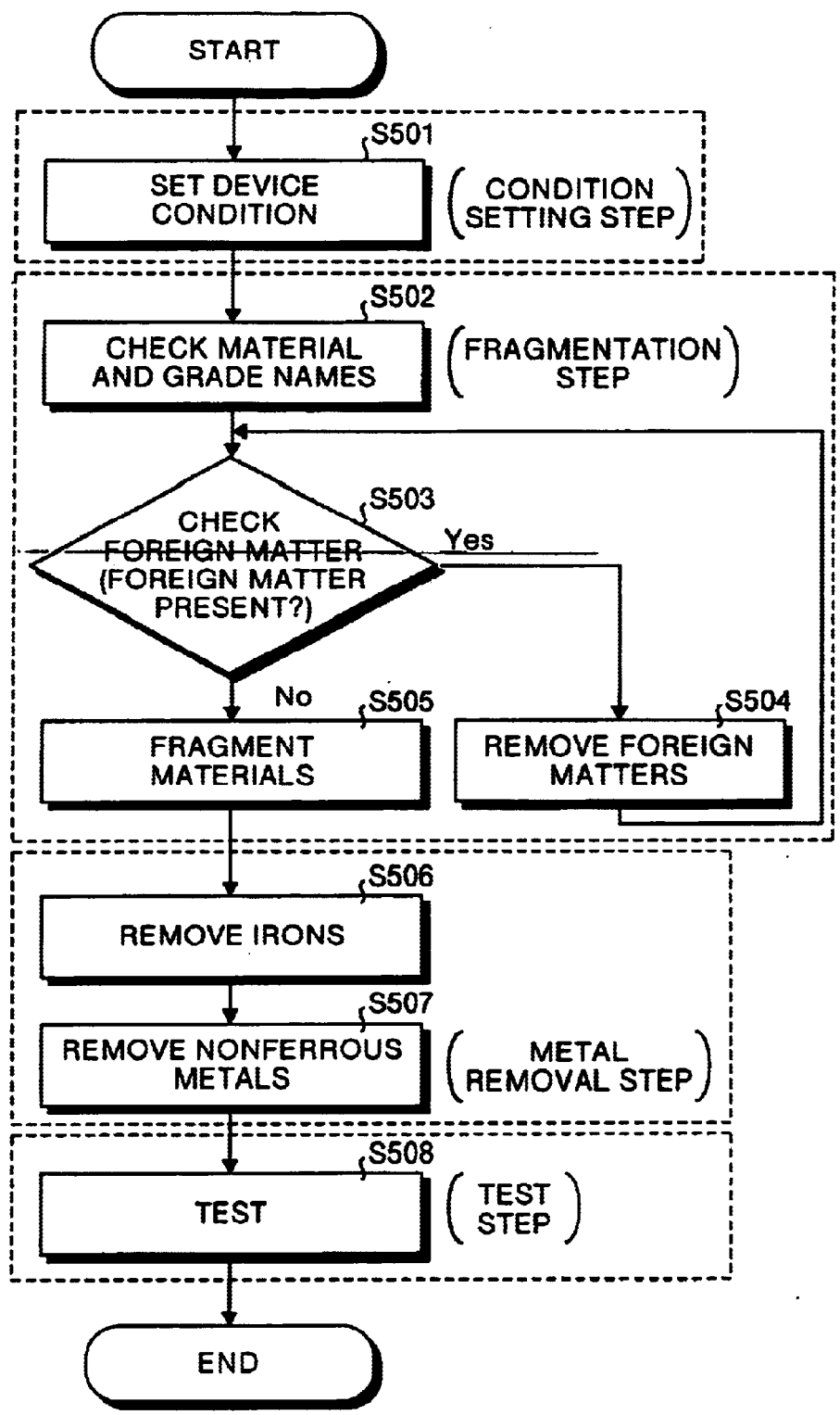
FIG. 12 shows an example of a workflow in the physical action step in PCMR.

Works at the physical action step 106 in PCMR is sequentially described below. FIG. 12 shows an example of a workflow at the physical action step in PCMR. In the physical action step 106 in PCMR, conditions are set first on a device for applying a physical action (Step S501). Specifically, based on the physical action information 116 acquired per plastic material type from the recycle unit definition step 100, conditions are set for the fractionator 901, the device for detecting and removing metals (not depicted) or the tester (not depicted).

Next, names of material and grade are checked (Step S502). Specifically, prior to deposition of the basis matter 105 into the fractionator 901, names of material and grade are checked whether they are correct or not. This is performed by checking a mark (not depicted) indicated on the storage container for use in storage of the plastic material together with confirming the mark 701 indicated on the component simultaneously.

Then, foreign matters are checked (Step S503). Specifically, it is performed through confirmation of a state of foreign matters removed at the fractionation step 104. If foreign matters are confirmed (Step S503, Yes), the foreign matters are removed from the component at site (Step S504). The work for removing foreign matters has the same content as the removal of foreign matters in the fractionation step 104 and is omitted herein to repeat its description.

If foreign matters are present, as it is required to improve quality of the work in the fractionation step 104, the result is appropriately transmitted to the recycle unit definition step 100, it required, for notifying the presence of foreign matters.

Subsequently, in the physical action step 106, materials are fragmented (Step S505). Specifically, the exterior cover 602 is deposited into the fractionator 901 and fractionated. Next, irons are removed (Step S506). Specifically, a magnetic force is employed to remove irons. Subsequently, nonferrous metals are removed (Step S507). Specifically, the eddy current system is employed to remove nonferrous metals such as aluminum.

Finally, in the physical action step 106, a quality test is performed (Step S508). When a matter passes the test, it is transferred as the physically acted matter 107 (the collected material 905 in the case of PCMR) to the next recycled material production step 108 for processing.

In the recycled material production step 108, a recycled material 109 is produced from the physically acted matter 107 through the physical action step 106. The recycled material production step 108 is often charged on resin makers in general, isolated from so-called product makers. In PCMR, at the recycled material production step 108, the collected material 905 is employed as a raw material to produce a recycled plastic. In this step, the recycled material 109 is produced based on the recycled material producer unit information 117 previously transmitted from the recycle unit definition step 100. In this case, the recycled material producer unit information 117 comprises information that includes definitions on recycled material producer units for producing the recycled materials from the physically acted basis matters and on standard values of the recycled materials.

In PCMR, a virgin material (not shown) may be compounded in the collected material 905 at a certain ratio.

Figure 13:
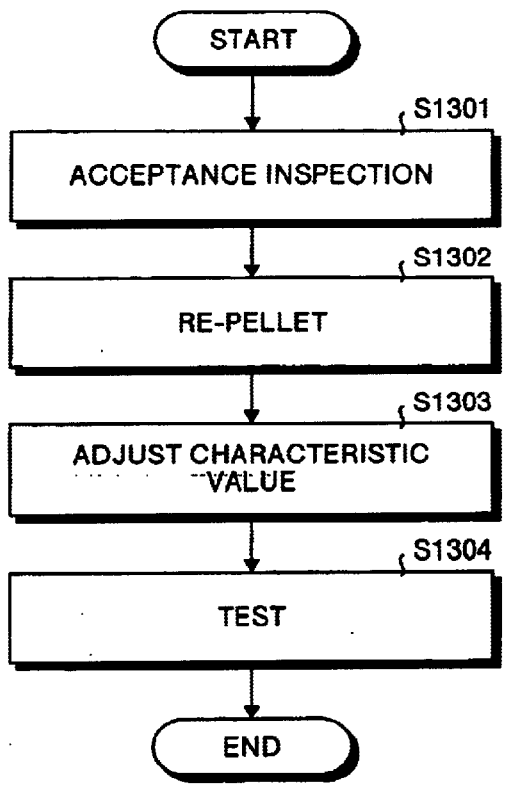
FIG. 13 shows an example of a workflow in the recycled material production step in PCMR.

Works in the recycled material production step 108 is sequentially described below. FIG. 13 shows an example of a workflow in the recycled material production step 108 in PCMR. At the recycled material production step 108 in PCMR, an acceptance inspection is performed first (Step S1301). Specifically, a resin maker checks the quality of the collected material 905.

Next, re-pellet is executed (Step S1302). Specifically, a virgin material is compounded in the collected material 905 at a certain ratio. Subsequently, the re-pelletized resin is adjusted on its characteristic values (Step S1303). Specifically, properties of the material such as flame retardancy, tone and melt index are adjusted. An adjuster agent may be deposited to achieve a target characteristic value, if required.

Finally, in the recycled material production step 108, a test is performed (Step S1304). This test is performed to check whether the standard as the recycled material 109 can be satisfied or not.

The recycled material 109 is then transferred to the recycled component production step 110 for processing. In the case of plastics, a molding process is mainly performed to produce the recycled component 111. Also in the recycled component production step 110, the recycled component producer unit information 119 is previously transmitted from the recycle unit definition step 100. Therefore, a system setting (not shown) for a molding machine and the recycled component producer unit information 119 is similar to that of the fractionator 901 described in FIG. 10. The recycled component producer unit information 119 includes definitions on recycled component producer units for producing recycled components from the recycled materials and on standard values of recycled components.

The recycled component 111 is launched into the market as a recycled machine via the recycled machine provision step 112.

In FIG. 1, steps from the classification step 102 to the recycled component production step 110 are ringed in series. Matters carried in and out of each step are completely independent between steps.

Therefore, each step is required to handle information only necessary for its own step. For example, in the recycled component production step 110, the recycled material 109 is an information source to determine its processing (that is, molding). Thus, when the plastic recycled component 111 is molded, no information is required at all on the recycled material 109 to indicate which of the collected machines 101 it originally belongs to.

In this embodiment, each step determines its recycle process manner in accordance with the matter itself that is carried into the step. Therefore, it is possible to simplify the process determination. At the same time, the recycle unit definition step 100 unitarily manages information. Thus, it is possible to process at each step while balancing the whole steps.

As described above, the recycle unit definition step 100 transfers the information for use in each step (the classifier unit information 114, the fractionator unit information 115, the physical action information 116, the recycled material producer unit information 117 and the recycled component producer unit information 119). A personal computer may be employed also in the recycle unit definition step 100 to manage information.

Figure 14:
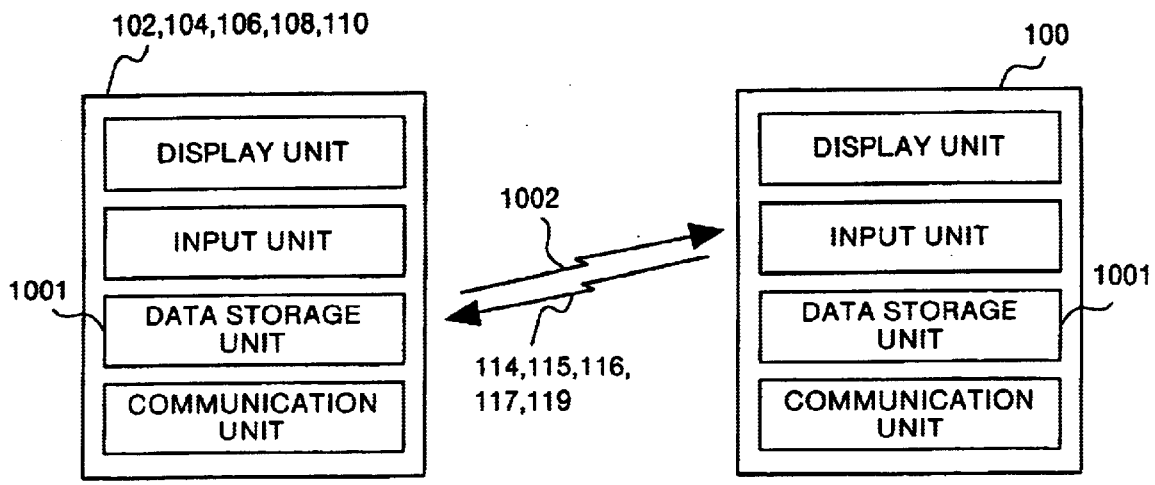
FIG. 14 is a schematic diagram which shows communication of information among personal computers used in each of the steps shown in FIG. 1.

FIG. 14 is a schematic diagram which shows communication of information among personal computers respectively used in the steps shown in FIG. 1. In this case, each step is similarly viewed as a personal computer, and the personal computer for use in the recycle unit definition step 100 is indicated as the personal computer 100. As shown, each personal computer is equipped with a data storage unit 1001. If information on an environmental load caused from another step (for example, $CO_2$ information) is transferred as environmental load information 1002 to the recycle unit definition step 100, it can manage environmental loads unitarily.

As obvious from the forgoing, according to the recycling method of the present invention, quality insurance is executed unitarily in the recycle unit definition step while including indispensable steps for the closed-loop material recycle. Therefore, work contents can be optimized in consideration of the whole balance. In addition, the process content can be determined directly based on the information from the recycle unit definition step and on the matter carried into each step. Thus, the closed-loop material recycle can be smoothly constructed.

The present document incorporates by reference the entire contents of Japanese priority document, 2001-144009 filed in Japan on May 14, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A recycling method of collecting used products or machines from the market, processing the collected machines to produce recycled machines as new products, and providing the recycled machines to the market, the recycling method comprising:

a classification step of classifying the collected machines on the basis of classifier unit information including definitions on classifications and specific classifier units for classifying the collected machines in accordance with recycling process levels;

a fractionation step of decomposing and fractionating the classified machines on the basis of fractionator unit information including definitions on decomposer/fractionator units for further decomposing and fractionating specific machines of the collected machines classified in the classification step and on fractionated basic matters including decomposed and fractionated basic units, components and materials;

a physical action step of applying a physical action to the fractionated basic matters on the basis of physical action information including definitions on a physical actor unit for applying a physical action to a specific basic matter selected from the fractionated basic matters and on a physically acted basic matter after application of the physical action;

a recycled material production step of producing a recycled material on the basis of recycled material producer unit information including definitions on recycled material producer units for producing recycled materials from the physically acted basic matter and on standard values of recycled materials;

a recycled component production step of producing a recycled component from the recycled materials on the basis of recycled component producer unit information including definitions on recycled component producer units for producing recycled components from the recycled materials and on standard values of recycled components; and a recycle unit definition step of creating the classifier unit information, the fractionator unit information, the physical action information, the recycled material producer unit information and the recycled component producer unit information, and transferring each of the information to the classification step, the fractionation step, the physical action step, the recycled material production step and the recycled component production step, respectively.

2. The recycling method according to claim 1, wherein the physical action includes fragmentation of the fractionated basic matter, the physically acted basic matter including a collected material fragmented into pieces after the fragmentation.

3. The recycling method according to claim 2, wherein the fractionated basic matter includes a plastic material contained in the collected machine, the fractionator unit information including information on technical units for decomposing and fractionating a plastic material from the collected machine, the recycled material including a recycled plastic material produced from the collected material consisting of the plastic material, the recycled material producer unit information including information on technical units for producing the recycled plastic material, the recycled component including a molding produced from the recycled plastic material, the recycled component producer unit information including a molding condition applied to the molding.

4. The recycling method according to claim 3, wherein the fractionator unit information includes information on a unit for determining whether the plastic material is contained in the collected machine.

5. The recycling method according to claim 3, wherein the physical action includes a unit in relation to magnetic metal separation.

6. The recycling method according to claim 3, wherein the recycled material includes plastics composed of the collected material and a virgin material compounded therein at a certain ratio.

7. The recycling method according to claim 3, wherein the fractionated basic matter includes a plastic material sectioned by names of material and grade, the fractionator unit information including information on technical units for fractionating the plastic material by material and by grade.

8. The recycling method according to claim 7, wherein the plastic material is additionally provided with a material grade transfer unit for transferring the names of material and grade, the material grade transfer unit having the same material quality as the plastic material and grade.

9. The recycling method according to claim 8, wherein the recycled plastic component or the recycled component is also additionally provided with a material grade name transfer unit.

10. The recycling method according to claim 8, wherein the material grade transfer unit includes a material name indication described on the plastic component.

11. The recycling method according to claim 10, wherein the recycled plastic component or the recycled component is also additionally provided with a material grade name transfer unit.

12. The recycling method according to claim 1, wherein the classifier unit information, the fractionator unit information, the physical action information, the recycled material producer unit information and the recycled component producer unit information are transferred using a communication unit.

13. The recycling method according to claim 12, wherein the communication unit includes a communication unit via the Internet.

14. The recycling method according to claim 12, wherein the classifier unit information, the fractionator unit information, the physical action information, the recycled material producer unit information and the recycled component producer unit information a restored at the recycle unit definition step in a certain data storage unit, from which each corresponding information is supplied to the recycle unit definition step, the classification step, the fractionation step, the physical action step, the recycled material production step and the recycled component production step.

15. The recycling method according to claim 14, wherein the classifier unit information, the fractionator unit information, the physical action information, the recycled material producer unit information and the recycled component producer unit information are each stored in a certain data storage unit at each of the classification step, the fractionation step, the physical action step, the recycled material production step and the recycled component production step.

16. The recycling method according to claim 1, wherein environmental load information or information on an environmental load caused from each step is determined at each of the classification step, the fractionation step, the physical action step, the recycled material production step and the recycled component production step, and transferred to the recycle unit definition step.

17. The recycling method according to claim 16, wherein the environmental load information is transferred using a communication unit.

18. The recycling method according to claim 16, wherein the environmental load information includes each amount of $CO_2$, $NO_x$, $SO_x$, BOD and a type and amount of final disposition.

19. The recycling method according to claim 18, wherein the environmental load information is transferred using a communication unit.

20. The recycling method according to claim 1, wherein quality information or information on quality of a matter carried out from each step is determined at each of the classification step, the fractionation step, the physical action step, the recycled material production step and the recycled component production step, and transferred to the recycle unit definition step.

21. The recycling method according to claim 20, wherein the quality information is transferred using a communication unit.

22. The recycling method according to claim 1, further comprising, in the recycled machine production step, producing from the recycled components a recycled machine to be provided to the market on the basis of recycled machine producer unit information including definitions on units for producing recycled machines from the recycled components, wherein the recycled machine producer unit information is created at the recycle unit definition step and transferred to the recycled machine production step.

* * * * *